US007010034B2

(12) United States Patent
Bruls et al.

(10) Patent No.: US 7,010,034 B2
(45) Date of Patent: Mar. 7, 2006

(54) VIDEO COMPRESSION

(75) Inventors: Wilhelmus Hendrikus Alfonsus Bruls, Eindhoven (NL); Reinier Bernardus Maria Klein Gunnewiek, Eindhoven (NL)

(73) Assignee: Koninklijke Philips Electronics N.V., Eindhoven (NE)

( * ) Notice: Subject to any disclaimer, the term of this patent is extended or adjusted under 35 U.S.C. 154(b) by 627 days.

(21) Appl. No.: 09/840,812

(22) Filed: Apr. 24, 2001

(65) Prior Publication Data

US 2001/0048718 A1 Dec. 6, 2001

(30) Foreign Application Priority Data

Apr. 27, 2000 (EP) .................................. 00201505
Nov. 2, 2000 (EP) .................................. 00203828

(51) Int. Cl.
*H04N 7/12* (2006.01)

(52) U.S. Cl. ............ 375/240.03; 375/240; 375/240.01; 375/240.02; 375/240.12

(58) Field of Classification Search ........... 375/240.03, 375/240.04, 240.12, 240.13, 240.02, 240.18, 375/240.22, 240, 240.01

See application file for complete search history.

(56) References Cited

U.S. PATENT DOCUMENTS 5,144,426 A * 9/1992 Tanaka et al. ......... 375/240.13
5,638,126 A 6/1997 Lim ........................... 348/405
5,892,548 A * 4/1999 Kim ...................... 375/240.04
5,990,955 A * 11/1999 Koz ...................... 375/240.01

OTHER PUBLICATIONS

Stephan Wenger, "Temporal Scalability Using P-Pictures for Low-Latency Applications", 1998 IEEE Second Workshop on Multimedia Signal Processing (Cat No. 98EX175), 1998 IEEE Second Workshop on Multimedia Signal Processing, Dec. 7-9 1998, pp. 559-564, XP002177102.

* cited by examiner

*Primary Examiner*—Allen Wong

(57) ABSTRACT

The concept of B-frames gives the MPEG video compression standard its high encoding efficiency. However, B-frame encoding roughly doubles the complexity of an MPEG encoder. In view thereof, MPEG encoders have been developed which produce I-frames and P-frames only. They are less complex but also less efficient. To improve the efficiency of such "IPP encoders", selected P-frames are quantized more coarsely than other P-frames, for example, by multiplying the conventional quantization step size by 1.4. Although this results in isolated frames ("virtual B-frames") being encoded with a lower quality, the overall perceptual quality is not affected. It has been found that the gain in bit rate obtained by the coarser quantization is not lost in subsequent P-frames, even though the subsequent frames are encoded with reference to the lower quality frames.

6 Claims, 2 Drawing Sheets

| I | P | P | P | P | P | I | P | P | P | P | P |
|---|---|---|---|---|---|---|---|---|---|---|---|
| 100% | 38% | 38% | 38% | 38% | 38% | 100% | 38% | 38% | 38% | 38% | 38% |

| I | P' | P | P' | P | P' | I | P' | P | P' | P | P' |
|---|---|---|---|---|---|---|---|---|---|---|---|
| 100% | 26% | 42% | 26% | 42% | 26% | 100% | 26% | 42% | 26% | 42% | 26% |

VIDEO COMPRESSION

FIELD OF THE INVENTION

The invention relates to a method of compressing a video signal, the method comprising predictively encoding frames of said video signal with reference to a prediction frame, calculating a quantization parameter for each encoded frame, and quantizing the encoded frames in accordance with said quantization parameter. The invention also relates to a compression arrangement, to a transmission or recording method and arrangement, to the compressed video signal and to a storage medium comprising that signal.

BACKGROUND OF THE INVENTION

A video compression method as defined in the opening paragraph has been standardized by the Motion Frames Expert Group and is well-known as MPEG1 or MPEG2. The known method includes transformation of video pixels into frequency coefficients, quantization of said coefficients, and variable-length coding of the quantized coefficients. The quantization is controlled so as to achieve a desired quality or bit rate of the compressed signal.

The MPEG compression method produces I, P and B-frames. I-frames are encoded autonomously, i.e. without reference to another frame. P-frames are predictively encoded with reference to a previous (possibly motion-compensated) I or P-frame. B-frames are bidirectionally predictively encoded with reference to a previous and a subsequent I or P frame. B-frames are not themselves used as reference for encoding other frames.

The concept of B-frames in MPEG provides maximum encoding efficiency. However, the use of B-frames roughly doubles the complexity, memory capacity and memory bandwidth. In view thereof, MPEG encoders have been developed which produce I and P-frames only ("IP encoders"). A disadvantage of IP encoders is their efficiency. They need approximately 10–20% more bit rate than IPB encoders.

OBJECT AND SUMMARY OF THE INVENTION

It is an object of the invention to provide an arrangement and method which overcomes the above-mentioned disadvantage of prior-art IP encoders.

To this end, the invention provides a video compression arrangement and method, a compressed signal, a storage medium, and a transmission or recording method and arrangement as defined in the independent claims. Advantageous embodiments are defined in the dependent claims.

The method in accordance with the invention quantizes selected P-frames more coarsely than other P-frames. This reduces the bit cost but degrades the image quality of said frames. The invention has a surprising effect. It was expected that the corresponding gain in bit cost would be lost in subsequent P-frames because the lower quality frames are used as prediction for subsequent P-frames. However, experiments have shown that this is not the case. It has been found that an IPPPP . . . sequence of frames, in which the quantization parameter of every other P-frame is multiplied by a factor of 1.4, has substantially the same bit rate as a conventional IBPBP . . . sequence having the same perceptual visual quality. In view thereof, the lower quality P-frames are also referred to as "virtual B-frames".

DESCRIPTION OF EMBODIMENTS

Figures 1, 2A, 2B:
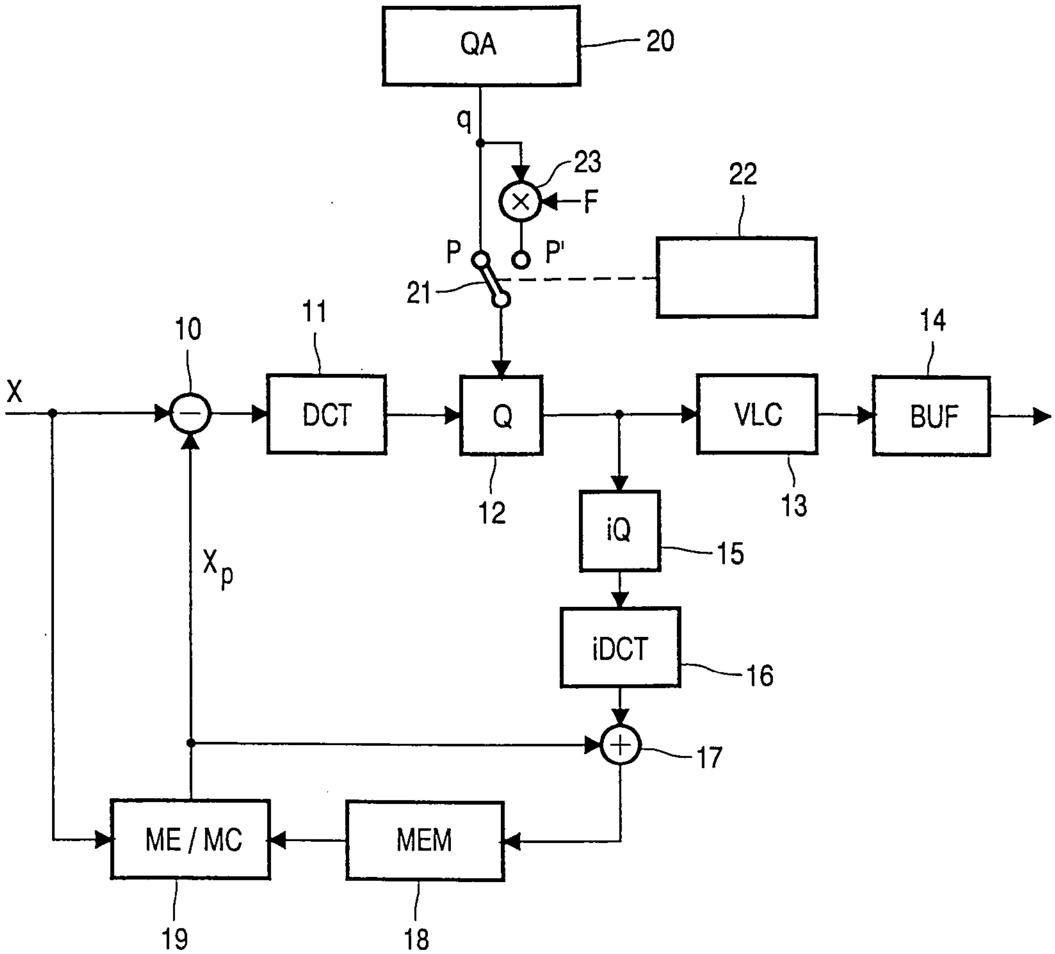
FIG. 1 shows a schematic diagram of a preferred embodiment of an arrangement for compressing a video signal encoder in accordance with the invention.
FIGS. 2A and 2B show diagrams illustrating the performance of the arrangement in accordance with the invention compared with the performance of a prior-art arrangement.

FIG. 1 shows a schematic diagram of an MPEG encoder in accordance with the invention. The Figure shows the encoder in the state in which P-frames are encoded. The encoder is a conventional MPEG encoder in the sense that it comprises a subtraction circuit 10, a discrete cosine transformer (DCT) 11, a quantizer (Q) 12, a variable-length coder (VLC) 13, a buffer (BUF) 14, an inverse quantizer (iQ) 15, an inverse discrete cosine transformer (iDCT) 16, an adder 17, a frame memory (MEM) 18, a motion estimation and compensation circuit (ME/MC) 19, and a quantization adapter (QA) 20.

Briefly summarized, the known encoder operates as follows. The input video frame X is divided into blocks of 8×8 pixels. The difference between each pixel block of input frame X and the corresponding block of a prediction frame $X_p$ is discrete cosine transformed into a block of 8×8 coefficients. The coefficients are subsequently quantized, by which perceptually irrelevant picture details are irreversibly removed (lossy compression). The quantized coefficients are variable-length encoded and stored in a buffer from which the signal is applied to a transmission channel or record carrier. The encoded frame is locally decoded by inverse quantization, inverse discrete cosine transformation, and addition to the prediction frame $X_p$. The reconstructed frame is stored in the frame memory and subjected to motion estimation and compensation so as to constitute the prediction frame for the next input frame.

The encoder includes a quantization adapter 20 for calculating the quantization steps with which the DCT-coefficients are quantized. In this embodiment, the MPEG2 quantization mechanism is used in which a predetermined quantization matrix, which defines the step sizes to be applied to the respective coefficients of an 8×8 coefficient block, is multiplied by a quantization scale factor q (herein further referred to as quantization parameter). The quantization parameter is adapted from frame to frame, but may be 'modulated' within a frame as a function of local image details. The quantization parameter may be controlled to represent a given image quality (resulting in a variable bit rate) or a given bit rate (resulting in a variable quality). Various embodiments of quantization adapters (also referred to as bit rate controllers) are known in the art and may be employed in the encoder according to the invention.

The arrangement in accordance with the invention increases the quantization parameter q for selected frames, thereby degrading the image quality of said frames but reducing their bit costs. In this embodiment, the arrangement includes a multiplier 23 which multiplies the quantization parameter q calculated by the quantization adapter 20 by a predetermined factor F (e.g. F=1.4). A switch 22 has a position P in which the conventional quantization parameter q is applied to the quantizer 12 and a position P' in which the coarser quantization parameter F.q is applied to the quantizer. The switch is controlled by a control circuit 22 in a predetermined manner. For example, the control circuit selects every other P-frame to be more coarsely quantized.

FIG. 2A shows a diagram illustrating the performance of a conventional MPEG2 encoder which produces a stream of IPPP . . . frames (no B-frames). Each frame is quantized in accordance with the quantization parameter q as calculated by the quantization adapter 20. The lower row of figures denotes the bit cost of the respective frame, expressed as a percentage of the bit cost of the respective I-frame. The bit cost of P-frames appears to be 38% in this example.

FIG. 2B shows a similar diagram for an encoder in accordance with the invention. The quantization adapter 20 has been set to produce the same image quality as in FIG. 2A. In accordance therewith, the bit cost for I-frames is the same as in FIG. 2A. Every other P-frame (denoted P' in the Figure) is now quantized with the quantization parameter 1.4q. The bit cost of the P'-frames is thereby reduced from 38% to 26%. The image quality of said frames is reduced in proportion therewith. The surprising effect of the invention is that the gain in bit cost is not lost in the subsequent 'conventional' P-frames. As shown in FIG. 2B, the bit cost of 'conventional' P-frames increases only from 38% to 42%. The net result is a considerable reduction of the bit rate at the same perceptual image quality (or a higher perceptual quality at the same bit rate) of the encoded video stream. In a practical experiment, the bit rate of a typical video signal was reduced from 15.2 Mbit/sec to 12.9 Mbit/sec at the same perceptual quality.

It is to be noted that the bit stream produced by an MPEG encoder in accordance with the invention fully complies with the MPEG standard. It should also be noted that although the invention has been described with reference to an IPP . . . encoder (no B-frames), the invention does not exclude B-frame encoding. For example, an encoder may produce an IBPBP . . . sequence in which selected P-frames have been quantized with the coarser quantization parameter. The coarser quantization parameter may even be applied to I-frames to the extent that such I-frames are used as prediction frames for subsequent frames.

Figure 3:
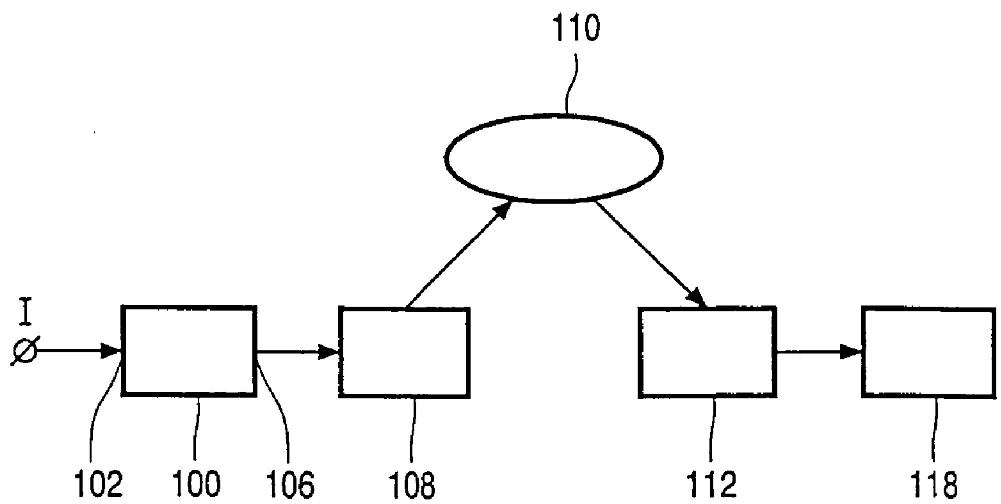
FIG. 3 shows a block diagram of embodiments of arrangements for transmitting and receiving a video signal.

FIG. 3 shows embodiments of arrangements for transmitting and receiving a video signal. An encoder 100 receives an image signal I on input 102. The encoder 100 is preferably constructed in accordance with the embodiment of FIG. 1, but may be any kind of compressed video signal encoder that supplies compressed video signals including first quantization parameters (q) representing a first quality or bit rate for quantizing selected first frames (P) of predictively encoded frames, and second quantization parameters (F.q) representing a second quality or bit rate that is lower than the first quality or bit rate for quantizing selected second frames (P') of the video signal. The compressed video signal is supplied at output 106 to a transmitter 108. The transmitter 108 then converts the compressed video signal into a transmission signal and applies the transmission signal to a transmission medium 110. The transmitter 108 and the transmission medium 110 may take any known form, for example, in the case of a broadcast, the transmitter 108 modulates the compressed video signal onto a radio frequency (RF) carrier wave, and the transmission medium 110 may comprise airwaves containing the radio waves, or a cable carrying the radio waves. Alternatively, it is known to supply digital signals via the Internet. As such, the transmitter 108 may comprises means for transmitting the compressed video signal over the transmission medium 110 comprising the Internet.

A receiver 112 coupled to the transmission medium 110 then receives the transmission signal and applies the image signal to a display device 118.

Figure 4:
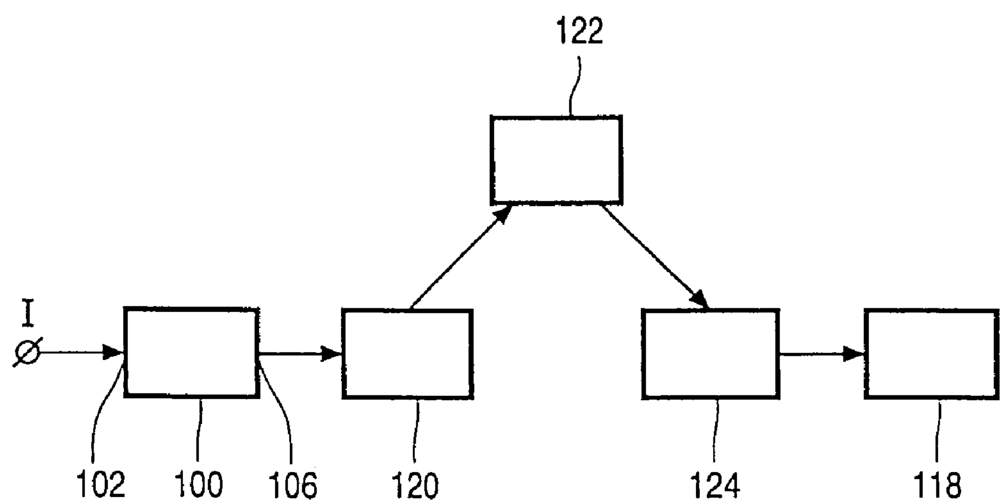
FIG. 4 shows a block diagram of embodiments of arrangements for recording a video signal on a storage medium and for playing back from the storage medium.

FIG. 4 shows a block diagram of embodiments of arrangements for recording and playing back a compressed video signal onto and from a record carrier. This arrangement is substantially similar to that shown in FIG. 3, except that the compressed video signal at the output 106 of the encoder 100 is applied to a recording device 120. The recording device 120 then converts the compressed video signal into a recording signal and records the recording signal onto the record carrier 122. The recording device 120 and the record carrier 122 may take any known form. For example, in the case of the record carrier 122 being a magnetic video tape, the recording device 120 may take the form of a helical scan video tape recorder. Alternatively, the record carrier 122 may be an optical disk, for example, CD-ROM, CD-R, DVD, DVD-ROM, DVD-R/W, etc. In that event, the recording device 120 would take the form of an optical disk recorder.

In order to play back the recording signal RS, the record carrier 122 is inserted into a playback device 124 which processes the recording signal RS and generates an image signal. As with the embodiment of FIG. 3, the playback device 124 applies the image signal to the display device 118.

The invention can be summarized as follows. The concept of B-frames gives the MPEG video compression standard its high encoding efficiency. However, B-frame encoding roughly doubles the complexity of an MPEG encoder. In view thereof, MPEG encoders have been developed which produce I-frames and P-frames only. They are less complex but also less efficient. To improve the efficiency of such "IPP encoders", selected P-frames are quantized more coarsely than other P-frames, for example, by multiplying the conventional quantization step size by 1.4. Although this results in isolated frames ("virtual B-frames") being encoded with a lower quality, the overall perceptual quality is not affected. It has been found that the gain in bit rate obtained by the coarser quantization is not lost in subsequent P-frames, even though the subsequent frames are encoded with reference to the lower quality frames.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements, and by means of a suitably programmed computer. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A method of compressing a video signal, the method comprising:

predictively encoding (10,11) frames (X) of said video signal with reference to a prediction frame($X_p$), calculating (20) a quantization parameter (q) for each encoded frame, quantizing (12) the encoded frames in accordance with said quantization parameter, characterized in that said step of calculating the quantization parameter includes calculating a first quantization parameter (q) representing a first quality or bit rate for quantizing selected first frames (P) of said predictively encoded frames, and a second quantization parameter (F.q) representing a second quality or bit rate that is lower than said first quality or bit rate for quantizing selected second frames (P') of the video signal, said second quantization parameter degrading the second quality compared to the first quality, wherein said predictively encoded frames constitute a series of successive frames, the second selected frames being every other frame of said series, the method further including:

decompressing (15–18) the compressed second frames to constitute the prediction frame ($X_p$) for predictively encoding the first frames.

2. A method as claimed in claim 1, wherein the step of calculating the second quantization parameter includes calculating said first quantization parameter (q) and multiplying (23) said first quantization parameter by a given factor (F).

3. An arrangement for compressing a video signal, the arrangement comprising:

encoding means (10,11) for predictively encoding frames (X) of said video signal with reference to a prediction frame ($X_p$), calculation means (20) for calculating a quantization parameter (q) for each encoded frame, a quantizer (12) for quantizing the encoded frames in accordance with said quantization parameter, characterized in that said calculation means (20) are arranged to calculate a first quantization parameter representing a first quality or bit rate for quantizing selected first frames (P) of said predictively encoded frames, and a second quantization parameter (F,q) representing a second quality or bit rate that is lower than said first quality or bit rate for quantizing selected second frames (P') of the video signal, said second quantization parameter degrading the second quality compared to the first quality, wherein said predictively encoded frames constitute a series of successive frames, the second selected frames being every other frame of said series, the arrangement further including:

means (15–18) for decompressing the compressed second frames to constitute said prediction frame ($X_p$) for predictively encoding first selected frames.

4. An arrangement as claimed in claim 3, wherein said calculation means (20) comprise a multiplier (23) for multiplying the first quantization parameter (q) by a given factor (F).

5. A method of transmitting or recording a video signal, the method comprising:

generating the compressed video signal comprising:

a prediction frame ($X_p$), predictively encoded (10,11) frames (X) that have been predictively encoded with reference to the prediction frame ($X_p$), respective quantization parameters (q) for respective encoded frames, the encoded frames having been quantized (12) in accordance with said respective quantization parameters, the quantization parameters including first quantization parameters (q) representing a first quality or bit rate for quantizing selected first frames (P) of said predictively encoded frames, and second quantization parameters (F.q) representing a second quality or bit rate that is lower than said first quality or bit rate for quantizing selected second frames (P') of the video signal, said second quantization parameters degrading the second quality compared to the first quality, wherein said predictively encoded frames constitute a series of successive frames, the second selected frames being every other frame of said series; and transmitting or storing the compressed video signal.

6. An arrangement for transmitting or recording a video signal, the arrangement comprising:

means (100) for generating the compressed video signal comprising:

a prediction frame ($X_p$);

predictively encoded (10,11) frames (X) that have been predictively encoded with reference to the prediction frame ($X_p$), and respective quantization parameters (q) for respective encoded frames, the encoded frames having been quantized (12) in accordance with said respective quantization parameters, the quantization parameters including first quantization parameters (q) representing a first quality or bit rate for quantizing selected first frames (P) of said predictively encoded frames, and second quantization parameters (F.q) representing a second quality or bit rate that is lower than said first quality or bit rate for quantizing selected second frames (P') of the video signal said second quantization parameters degrading the second quality compared to the first quality, wherein said predictively encoded frames constitute a series of successive frames, the second selected frames being every other frame of said series; and means (108, 120) for transmitting or recording the compressed video signal.

* * * * *